United States Patent
Kim et al.

(10) Patent No.: US 10,176,934 B2
(45) Date of Patent: Jan. 8, 2019

(54) BENDABLE YARN TYPE SUPER CAPACITOR

(71) Applicant: IUCF-HYU (INDUSTRY-UNIVERSITY COOPERATION FOUNDATION HANYANG UNIVERSITY), Seoul (KR)

(72) Inventors: Seon Jeong Kim, Seoul (KR); Chang Soon Choi, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 89 days.

(21) Appl. No.: 15/106,204

(22) PCT Filed: Dec. 9, 2014

(86) PCT No.: PCT/KR2014/012042
§ 371 (c)(1),
(2) Date: Jun. 17, 2016

(87) PCT Pub. No.: WO2015/093771
PCT Pub. Date: Jun. 25, 2015

(65) Prior Publication Data
US 2016/0336119 A1  Nov. 17, 2016

(30) Foreign Application Priority Data

Dec. 17, 2013 (KR) ........................ 10-2013-0156850

(51) Int. Cl.
*H01G 11/36* (2013.01)
*H01G 11/56* (2013.01)
(Continued)

(52) U.S. Cl.
CPC ............. *H01G 11/36* (2013.01); *H01G 11/24* (2013.01); *H01G 11/56* (2013.01); *B82Y 30/00* (2013.01); *B82Y 40/00* (2013.01); *Y02E 60/13* (2013.01)

(58) Field of Classification Search
CPC ......... H01G 11/36; H01G 11/56; H01G 11/24
See application file for complete search history.

(56) References Cited

U.S. PATENT DOCUMENTS 5,585,208 A * 12/1996 Lian ........................ H01G 9/22
                                                      252/500
8,246,860 B2   8/2012 Liu et al.
(Continued)

FOREIGN PATENT DOCUMENTS

CN     102881463 B    3/2016
JP     2011-88814 A   5/2011
(Continued)

OTHER PUBLICATIONS

International Search Report dated Feb. 17, 2015 in PCT/KR2014/012042 filed on Dec. 9, 2014.

*Primary Examiner* — Eric W Thomas
(74) *Attorney, Agent, or Firm* — Oblon, McClelland, Maier & Neustadt, L.L.P.

(57) ABSTRACT

The present invention relates to a carbon nanotube/manganese dioxide yarn electrode comprising: a yarn type carbon nanotube yarn which is prepared by twisting a carbon nanotube sheet and has a plurality of pores therein; and manganese dioxide deposited on a surface or in inner pores of the carbon nanotube yarn, and to a yarn type super capacitor comprising the same. The super capacitor has excellent mechanical strength and flexibility while having high specific capacity, energy density, and power density, and thus can retain superior electrochemical performances (Continued)

even under several modifications, such as twisting, bending, and weaving.

15 Claims, 8 Drawing Sheets

(51) Int. Cl.
*H01G 11/24* (2013.01)
*B82Y 40/00* (2011.01)
*B82Y 30/00* (2011.01)

(56) References Cited

U.S. PATENT DOCUMENTS

| | | | |
|---|---|---|---|
| 8,246,861 B2 | 8/2012 | Zhou et al. | |
| 8,810,995 B2 | 8/2014 | Zhou et al. | |
| 2011/0097512 A1* | 4/2011 | Zhou | H01B 1/04 |
| | | | 427/545 |
| 2011/0170236 A1* | 7/2011 | Young | H01G 9/016 |
| | | | 361/502 |
| 2013/0217289 A1* | 8/2013 | Nayfeh | H01G 11/30 |
| | | | 442/301 |
| 2016/0172123 A1* | 6/2016 | Yang | H01G 11/24 |
| | | | 361/502 |

FOREIGN PATENT DOCUMENTS

| | | |
|---|---|---|
| KR | 10-1126784 B1 | 4/2012 |
| KR | 10-2013-0100239 A | 9/2013 |
| KR | 10-2013-0131086 A | 12/2013 |

\* cited by examiner

BENDABLE YARN TYPE SUPER CAPACITOR

TECHNICAL FIELD

The present invention relates to a flexible yarn electrode and a yarn supercapacitor including the yarn electrode. More specifically, the present invention relates to a yarn electrode that is prepared by twisting carbon nanotube sheets into a yarn and depositing manganese dioxide on the yarn, and a yarn supercapacitor including the yarn electrode.

BACKGROUND ART

There has been a lot of interest in flexible, lightweight, and high-power energy devices for wearable smart cloth and miniaturized electronic applications. To meet the demands for such applications, recent research has focused on dimension conversion of energy devices from three- or two-dimensional (3D, 2D) types to one-dimensional (1D) fibrous structure. Such a trend is well demonstrated in energy generation or conversion fields, for example, fiber photovoltaic cells, fiber piezoelectric generators, fiber thermoelectric generators, and fiber biofuel cells.

As for supercapacitors, one of the next-generation energy storage media for a high level of electrical power and long lifetime, nanowire-microfiber hybrid-structure supercapacitors, a pen ink decorated metal wire supercapacitor, and a self-powered system integrated supercapacitor have recently been reported. Nevertheless, such fiber supercapacitors still suffer from complicated fabrication methods and complex structures and have low flexibility. The fiber supercapacitors are only slightly bendable, which limits their application to large-size devices and wearable and portable electronics where flexibility is needed.

Meanwhile, realizing high electrochemical performance of supercapacitors is another important issue. Especially for supercapacitors based on manganese oxide ($MnO_2$), a promising transition metal oxide as a pseudo-capacitive material with high theoretical capacitance, low cost, natural abundance, and environmental friendliness, overcoming the poor electrical conductivity ($10^{-5}$-$10^{-6}$ S/cm) of the $MnO_2$ still remains an unavoidable challenge to be addressed for optimization of its charge storage performance. Accordingly, several research groups have introduced some structural strategies for electrode design in order to enhance the electrical conductivity and facilitate the full utilization of $MnO_2$ by incorporating metal oxide or metal-based nanostructures as an effective electron pathway. For example, a variety of nanowires, such as $SnO_2$, ZnO, $ZnSnO_4$, $Co_3O_4$, and $WO_3$, have been grown on the surface of current collectors and nanoscopic $MnO_2$ deposited on them to fabricate core-shell-structured hybrid electrodes [(a) J. Yan et al. *ACS Nano* 2010, 4, 4247; (b) J. Bae et al. *Angew. Chem., Int. Ed.* 2011, 50, 1683; (c) L. Bao et al. *Nano Lett.* 2011, 11, 1215; (d) J. Liu et al. *Adv Mater.* 2011, 23, 2076; (e) X. Lu et al. *Adv Mater.* 2012, 24, 938]. In addition, nanotube arrays of Mn have been synthesized and the tube surface oxidized to make a manganese dioxide/manganese/manganese dioxide sandwich-structured electrode [Q. Li et al. *Nano Lett.* 2012, 12, 3803]. High electrolyte surface area and a fast charge storage process have been effectively achieved by such uniquely designed architectures, resulting in high specific capacitance and rate capability. However, these electrodes require complex multistep fabrication processes for growing nanostructures and they can be sensitive to mechanical deformation such as folding or twisting, thus being unsuitable for real applications.

Korean Patent No. 1,126,784 discloses a hybrid supercapacitor having a non-woven fabric structure in which manganese oxide is deposited on a PAN-based carbon nanofiber produced by electrospinning. The hybrid supercapacitor exhibits the functions of both a high-capacity pseudocapacitor and a double layer capacitor, achieving high energy and power densities. However, due to its low tensile strain or flexibility, the hybrid supercapacitor is difficult to utilize in electronics subjected to high strain rates and wearable and portable electronic textiles.

DETAILED DESCRIPTION OF THE INVENTION

Problems to be Solved by the Invention

Therefore, the present invention is intended to provide a flexible yarn electrode based on manganese dioxide and a highly flexible, lightweight carbon nanotube yarn structure that exhibits high power density and good capacitive characteristic when employed as a supercapacitor electrode.

The present invention is also intended to provide a yarn supercapacitor including the carbon nanotube/manganese dioxide yarn electrode that has high energy storage performance even under flexible conditions and is processable into a wearable textile.

Means for Solving the Problems

One aspect of the present invention provides a carbon nanotube/manganese dioxide yarn electrode including a carbon nanotube yarn with internal pores prepared by twisting carbon nanotube sheets and manganese dioxide deposited on the surface and in the internal pores of the carbon nanotube yarn.

According to one embodiment of the present invention, the carbon nanotube yarn may have a layer-by-layer structure and pores formed during twisting. The carbon nanotube yarn is prepared by twisting one to five carbon nanotube sheets 7,000 to 12,000 times per meter.

According to one embodiment of the present invention, the carbon nanotube yarn may have a diameter ranging from 15 µm to 30 µm.

According to one embodiment of the present invention, the manganese dioxide may be deposited to a thickness of 100 nm to 500 nm on the surface of the carbon nanotube yarn and to a depth of 1 µm to 5 µm below the surface of the carbon nanotube yarn.

According to one embodiment of the present invention, the manganese dioxide may be present in an amount of 4.0 to 6.0% by weight, based on the total weight of the carbon nanotube/manganese dioxide yarn electrode.

According to one embodiment of the present invention, the pores may include mesopores with a diameter of 2 nm to 50 nm and macropores with a diameter of 50 nm to 1000 nm and the carbon nanotube yarn may have a porosity of 40 to 80%.

According to one embodiment of the present invention, the carbon nanotube yarn may have a bias angle of 20° to 40° and may be twisted to the right (Z-lay) or left (S-lay).

A further aspect of the present invention provides an electrode textile including the carbon nanotube/manganese dioxide yarn electrode.

Another aspect of the present invention provides a flexible, bendable, knottable, and weavable yarn supercapacitor including the carbon nanotube/manganese dioxide yarn electrode.

Yet another aspect of the present invention provides a flexible, bendable, knottable, and weavable solid-state composite yarn supercapacitor including the carbon nanotube/manganese dioxide yarn electrode as a first electrode, a second electrode of the same type as the first electrode, and a polyvinyl alcohol-potassium hydroxide solid electrolyte coated on the two electrodes.

According to one embodiment of the present invention, the solid-state composite yarn supercapacitor may have a maximum volumetric capacitance of 20 to 40 F/cm$^3$.

Effects of the Invention

The yarn electrode of the present invention is prepared by twisting carbon nanotube sheets into a yarn and depositing manganese dioxide on the yarn. The supercapacitor of the present invention uses the yarn electrode. The supercapacitor of the present invention has very high performance and maintains its high electrochemical performance under applied deformation, for example, bending, twisting or weaving, because of its highly internally porous structure, extraordinary mechanical properties and good electrical conductivity.

BRIEF DESCRIPTION OF THE DRAWINGS

FIG. 3 shows the results of analysis of the cross section of a CMY electrode prepared in Example 1.2. (a) of FIG. 3 is a cross-sectional SEM image of the CMY electrode (scale bar=500 nm) and shows three-dimensional connection of shaped or unshaped pores and high internal porosity. The scale bar in the bottom left inset represents 5 μm. (b) of FIG. 3 shows a magnified cross-sectional image of an edge part of the CMY electrode. The image reveals a core/shell (CNT/MnO$_2$) structure and gradual concentration decrement of deposited MnO$_2$ in the carbon nanotube yarn in the direction of the core. (c) of FIG. 3 shows the results of elemental mapping by energy dispersive spectroscopy (EDS) over the cross-sectional image (b). Carbon is distributed uniformly over the cross section of the CMY electrode, but both manganese and oxygen are present at higher concentrations at the surface of the CMY electrode and are distributed at gradually decreasing concentrations in the direction of the core. (d) of FIG. 3 shows EDS line-scan data on the edge part of the CMY electrode along the dashed line shown in (b), confirming the atomic percentages of manganese and oxygen start to gradually degrease from the surface of the CMY electrode in the direction of the core, having a concentration gradient to a depth of 2-3 μm.

BEST MODE FOR CARRYING OUT THE INVENTION

The present invention will now be described in more detail.

One aspect of the present invention is directed to a highly flexible, lightweight carbon nanotube/manganese dioxide yarn electrode that exhibits high power density and good capacitive characteristic when employed as a supercapacitor electrode.

The carbon nanotube/manganese dioxide yarn electrode of the present invention includes a carbon nanotube yarn prepared by twisting carbon nanotube sheets. The carbon nanotube yarn has pores formed during twisting. Manganese dioxide is deposited on the surface and in the internal pores of the carbon nanotube yarn.

Specifically, one to five carbon nanotube sheets drawn from a carbon nanotube forest may be stacked and twisted to make the carbon nanotube yarn, affording a layer-by-layer structure and internal porosity. The carbon nanotube/manganese dioxide yarn electrode of the present invention may be prepared by electrochemical deposition of manganese dioxide on the surface and in the internal pores of the carbon nanotube yarn.

The carbon nanotube yarn prepared by twisting carbon nanotube sheets may have a diameter of 15 to 30 μm. Carbon nanotube bundles of the yarn are uniaxially aligned in one direction at a constant bias angle ranging from 20° to 40° and have pores formed therein.

The carbon nanotube yarn may have mesopores with an average diameter of 2 to 50 nm and macropores with a diameter of 50 nm to 1000 nm. The carbon nanotube yarn may have a porosity of 40 to 80%.

There is no particular restriction on the shape of the pores. For example, the pores may consist of mesopores whose average diameter is from 2 to 50 nm and macropores whose diameter is greater than 50 nm but not greater than 1000 nm. The carbon nanotube yarn may have a porosity of 40 to 80%.

The carbon nanotube yarn constitutes the basic body of the yarn electrode according to the present invention. Owing to the three-dimensional porosity inside the yarn, the manganese dioxide as a capacitive material is deposited to a thickness of 100 to 500 nm on the surface of the carbon nanotube yarn and to a depth of 1 to 5 μm below the surface of the carbon nanotube yarn and is trapped in the inner mesopores during deposition, resulting in the formation of a hybridized zone in which the nanoscopic manganese dioxide and the aligned carbon nanotube bundles coexist.

The hybridized zone enables an enlarged electrolytic surface area of the manganese dioxide, providing more active sites for cations during faradic reaction. Moreover, short ion-diffusion length is achieved by the pore-trapped manganese dioxide, which preferably enables full utilization of the manganese dioxide even at high scan rate. Finally, effective electron delivery between the manganese dioxide as a capacitive material and the uniaxially aligned carbon nanotube bundles is accomplished, leading to low resistance of the electrode. Consequently, a supercapacitor employing the carbon nanotube/manganese dioxide yarn electrode has high values of specific capacitance and energy and average power densities, achieving high electrochemical energy storage performance.

The amount of the manganese dioxide deposited may be from 4.0 to 6.0% by weight, based on the total weight of the carbon nanotube/manganese dioxide yarn electrode.

The easy fabrication processes for the carbon nanotube/manganese dioxide yarn electrode of the present invention are suitable for a mass-production system. The carbon nanotube/manganese dioxide yarn electrode of the present invention is flexible, bendable, knottable, and weavable. Particularly, the carbon nanotube/manganese dioxide yarn electrode of the present invention undergoes less reduction in capacitance even after repeated bending with 90° bending angle 1000 times or more. Even after knotting and winding of the electrode, no significant capacitance drop occurs. Based on these characteristics, the electrode can also be used to produce a wearable electronic textile by weaving.

A further aspect of the present invention is directed to a highly flexible yarn supercapacitor with high power density and good capacitance characteristic which includes the carbon nanotube/manganese dioxide yarn electrode.

Another aspect of the present invention is directed to a highly flexible solid-state composite yarn supercapacitor using the carbon nanotube/manganese dioxide yarn electrode and another yarn electrode of the same type.

The solid-state composite yarn supercapacitor may be fabricated by twisting the carbon nanotube/manganese dioxide yarn electrode as a first electrode with a second electrode of the same type as the first electrode to make a single yarn electrode and coating the single yarn electrode with a polyvinyl alcohol-potassium hydroxide gel electrolyte. Alternatively, the solid-state composite yarn supercapacitor may be fabricated by arranging the carbon nanotube/manganese dioxide yarn electrode and another yarn electrode of the same type parallel to each other at an interval of 1 to 10 nm and coating the two electrodes with a polyvinyl alcohol-potassium hydroxide gel electrolyte.

As proposed above, the two carbon nanotube/manganese dioxide yarn electrodes are twisted into a single thread or are arranged parallel to each other to make a single thread before coating with a polyvinyl alcohol-potassium hydroxide gel electrolyte. However, there is no particular restriction on the fabrication of the solid-state composite yarn supercapacitor so long as an electrical short circuit is not caused.

The flexible carbon nanotube/manganese dioxide yarn electrode of the present invention may be prepared by a method including the following steps:

(a) preparing carbon nanotube sheets from a carbon nanotube forest;

(b) twisting the carbon nanotube sheets to prepare a carbon nanotube yarn having a layer-by-layer structure and internal pores; and (c) depositing manganese dioxide on the carbon nanotube yarn.

In step (b), the carbon nanotube sheets are twisted 7,000 to 12,000 times per meter such that the carbon nanotube yarn has a diameter of 15 to 30 μm and a bias angle of 20 to 40°.

The bendable, knottable, and weavable solid-state composite yarn supercapacitor of the present invention may be fabricated by a method including the following steps:

(d) twisting the carbon nanotube/manganese dioxide yarn electrode prepared in step (c) with another yarn electrode of the same type to prepare a single carbon nanotube/manganese dioxide two-ply yarn electrode; and (e) coating two-ply yarn electrode with a polyvinyl alcohol-potassium hydroxide (PVA-KOH) electrolyte.

Alternatively, the bendable, knottable, and weavable solid-state composite yarn supercapacitor of the present invention may be fabricated by a method including the following steps:

(d') arranging the carbon nanotube/manganese dioxide yarn electrode prepared in step (c) and another yarn electrode of the same type parallel to each other at a fine interval; and (e) coating PVA-KOH electrolyte on the two carbon nanotube/manganese dioxide yarn electrodes arranged at a fine interval.

According to one embodiment of the present invention, the carbon nanotube/manganese dioxide yarn electrode coated with the polyvinyl alcohol-potassium hydroxide (PVA-KOH) electrolyte may be twisted with another coated carbon nanotube/manganese dioxide yarn electrode to make a single yarn, followed by electrolyte coating.

According to an alternative embodiment of the present invention, the carbon nanotube/manganese dioxide yarn electrode coated with the polyvinyl alcohol-potassium hydroxide (PVA-KOH) electrolyte may be arranged parallel to another coated carbon nanotube/manganese dioxide yarn electrode, followed by electrolyte coating to make a single yarn.

Mode for Carrying out the Invention

The present invention will be explained in more detail with reference to the following examples. These examples are provided to assist in understanding the invention and the scope of the invention is not limited thereto.

EXAMPLE 1

Fabrication of Yarn Supercapacitor

EXAMPLE 1.1

Preparation of Carbon Nanotube Yarn

Multi-walled carbon nanotube sheets were drawn from a CNT forest fabricated using the chemical vapor deposition (CVD) method. Two layers of 3 mm×75 mm-sized sheets were stacked and densified by dipping in ethanol. The sheets were twisted 10,000 times per meter to make a strong and flexible carbon nanotube yarn (hereinafter also referred to as "CNT yarn") having a diameter of about 15-30 µm.

EXAMPLE 1.2

Preparation of Carbon Nanotube/Manganese Dioxide Yarn Electrode

Electrochemical deposition of manganese dioxide was conducted with a three-electrode system (CHI 627b, CH instrument) using Ag/AgCl as the reference electrode and Pt mesh as the counter electrode. Manganese dioxide was deposited onto the carbon nanotube yarn prepared in Example 1.1 using the potentiostatic method. A potential of 1.3 V was applied for 3-6 s in an electrolyte of 0.02 M $MnSO_4 \cdot 5H_2O$ and 0.2 M $Na_2SO_4$ to prepare a carbon nanotube/manganese dioxide yarn electrode (hereinafter also referred to as "CMY").

EXAMPLE 1.3

Fabrication of Solid-State Carbon Nanotube/Manganese Dioxide Composite Yarn Supercapacitor PVA-KOH gel electrolyte was prepared by dissolving 3 g of polyvinyl alcohol (PVA) and 1.62 g of KOH in 30 mL of deionized water and heating the solution to 90° C. until the solution became transparent. Two carbon nanotube/manganese dioxide yarn electrodes prepared in Example 1.2 were dip coated with the PVA-KOH gel electrolyte and dried at room temperature for 5 h.

Then, the two PPVA-KOH coated carbon nanotube/manganese dioxide yarn electrodes were twisted into a single thread so as not to cause an electrical short circuit. The thread was again coated with PVA-KOH to make a highly flexible solid-state carbon nanotube/manganese dioxide composite yarn (hereinafter also referred to as "solid-state CMY") supercapacitor.

COMPARATIVE EXAMPLE 1

Preparation of Control Electrode

The role of the manganese dioxide trapped in the carbon nanotube yarn was investigated. To this end, manganese dioxide was deposited onto carbon fiber (MCF) as a control electrode, which has no internal porosity.

EXAMPLE 2

Fabrication of Electrode Textile

Figure 6:
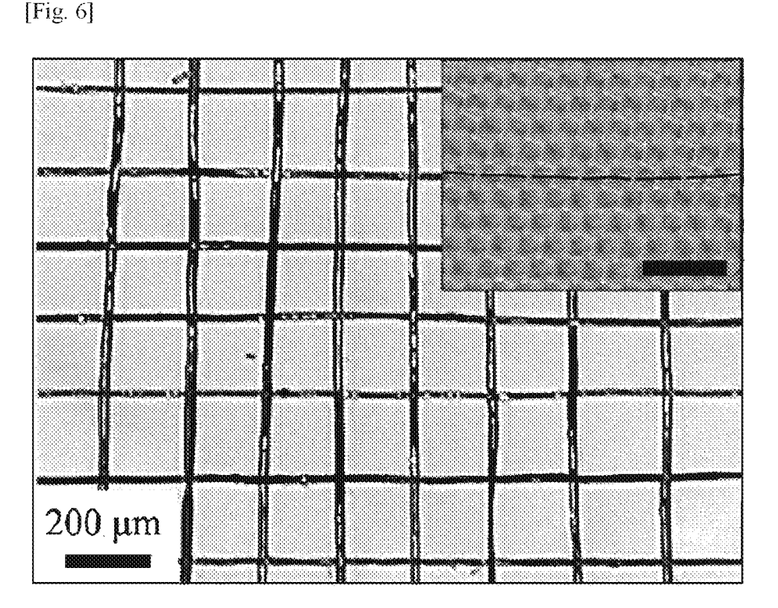
FIG. 6 is an optical image of a woven electrode textile consisting of several CMY electrodes, which was prepared in Example 2 (inset, scale bar=1 mm).

Because of the high flexibility and mechanical properties of the CMY electrode prepared in Example 1.2, the CMY electrode is expected to be useful as a building block for electronic cloth. 15 CMY electrodes were woven into a textile, as shown in FIG. 6.

The electrode textile can capture energy from the environment and store the energy for later use. Therefore, the CMY electrode can be an ideal energy storage medium for integrated or packed energy system with already reported 1-D fibrous energy conversion or generation devices.

EXPERIMENTAL EXAMPLE 1

Characterization of the Yarn Supercapacitor

Cross sections of the CNT yarn of Example 1.1 and the CMY of Example 1.2 were prepared by cutting using a Ga ion beam (7 nA beam current) in a focused ion beam instrument operated at 30 kV. The cut CNT yarn and CMY were cleaned and transferred to a SEM (Zeiss Supra 40) to perform the microscopy (at 15 kV) and elemental energy-dispersive X-ray spectroscopy (EDAX) mapping analysis (at 20 kV). SEM images other than the cross sections were obtained using an FE SEM-S4700 (Hitachi).

EXPERIMENTAL EXAMPLE 1.1

SEM Analysis

Figure 1:
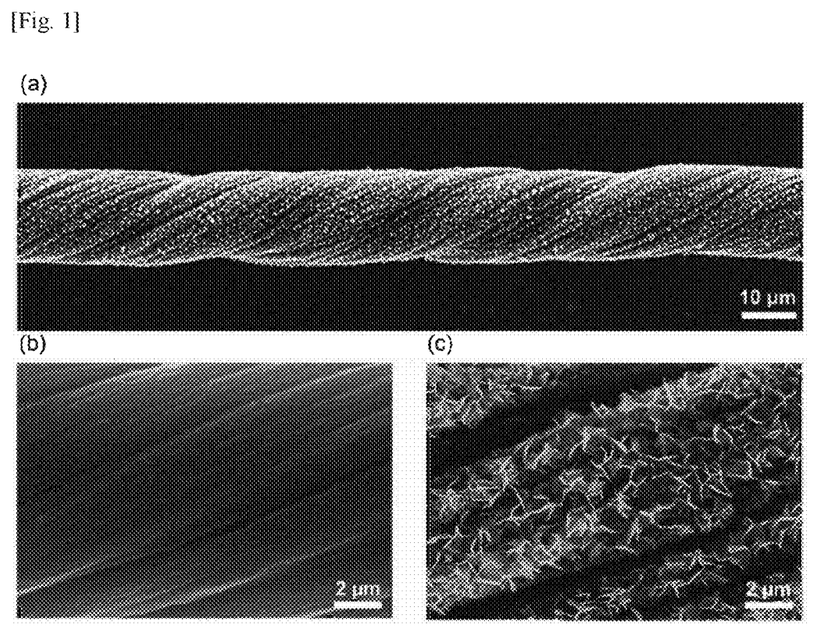
FIG. 1 shows scanning electron microscopy (SEM) images of a carbon nanotube (CNT)/manganese dioxide (MnO$_2$) yarn (hereinafter also referred to simply as "CMY") prepared by twisting carbon nanotube sheets into a carbon nanotube yarn with internal pores and electrochemically depositing manganese dioxide on the surface and in the internal pores of the carbon nanotube yarn in Example 1.2. (a) of FIG. 1 is an overview SEM image of the CMY. The as-calculated volume is 3.1×10$^{-6}$ cm$^3$, assuming that the CMY is cylindrical. (b) of FIG. 1 is a magnified SEM image of the carbon nanotube yarn having a layer-by-layer structure and internal pores formed when carbon nanotube sheets are twisted. (c) of FIG. 1 is a magnified SEM image of the CMY in which a coating layer of flower-shaped manganese dioxide particles is formed along the surface, the layer-by-layer structure, and the internal pores by deposition.

The carbon nanotube/manganese dioxide yarn (CMY) electrode is presented in FIG. 1.

In FIG. 1, (a) is a scanning electron microscopy (SEM) image of the CMY electrode and shows the overview morphology of the electrode. From the SEM image, the bias angle α, which is the angle between the longitudinal direction of the yarn electrode and the orientation direction of the carbon nanotube bundle, is about 30° and the diameter of the electrode is 16-28 µm.

In FIG. 1, (b) is a magnified SEM image of the carbon nanotube yarn having a layer-by-layer structure and internal pores formed when multi-walled carbon nanotube sheets are twisted. The carbon nanotube bundles were uniaxially aligned in one direction to provide a highly effective electron pathway, which can be advantageously used as a current collector for flexible 1D electronic devices.

In FIG. 1, (c) is an image of the CMY in which manganese dioxide is deposited and shows the formation of a flower-like patterned deposit between the surface and the layer-by-layer structure of the carbon nanotube yarn.

EXPERIMENTAL EXAMPLE 1.2

Elemental Mapping Analysis

X-ray photoelectron spectroscopy (XPS, VG Multilab ESCA 2000 system) analysis was carried out to determine the oxidation state of the manganese dioxide.

Figure 2:
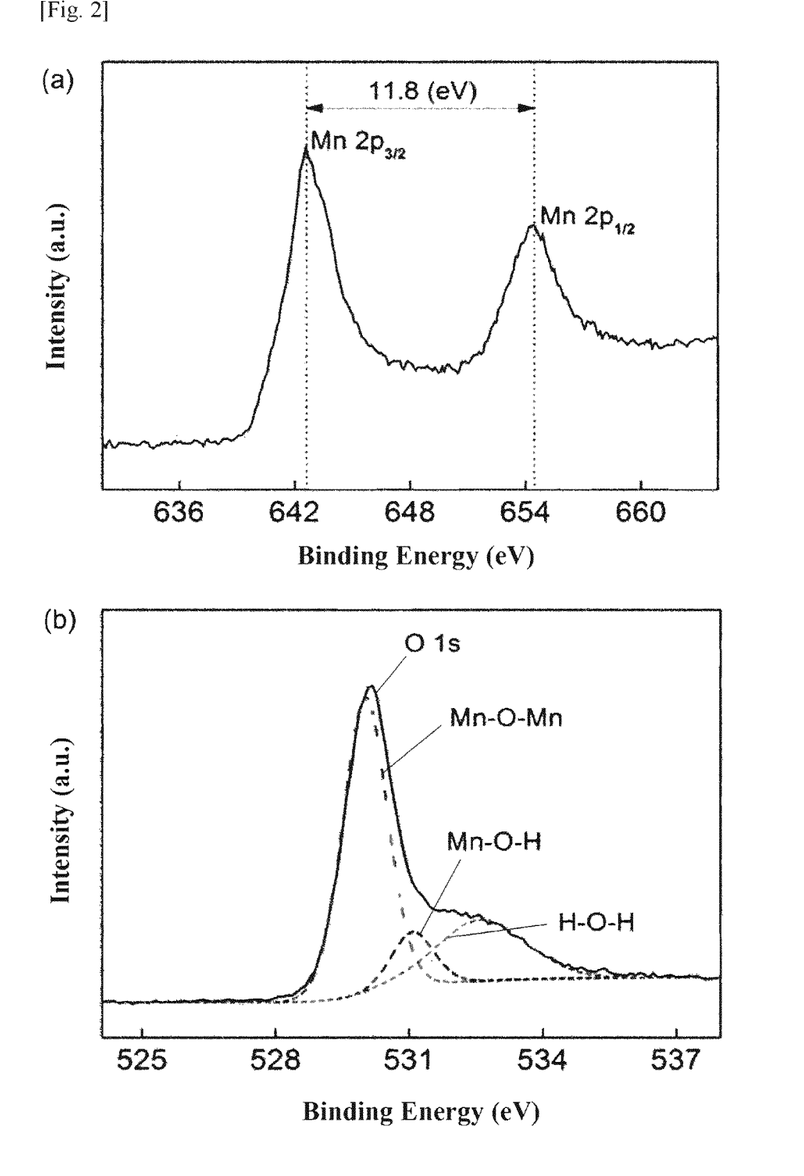
FIG. 2 shows the results of X-ray photoelectron spectroscopy (XPS) of a MnO$_2$ coating layer of a CMY electrode prepared in Example 1.2 for oxidation state determination. (a) and (b) of FIG. 2 show the binding energies of Mn 2p and O 1 s components, respectively, as analyzed by XPS.

As shown in (a) of FIG. 2, the binding-energy separation between the Mn $2p_{3/2}$ and Mn $2p_{1/2}$ doublet peaks is 11.8 eV, which exactly matches the reported theoretical value. From the oxygen 1 s orbital analysis, intensity ratios of overlapping peaks, Mn—O—Mn, Mn—O—H, and H—O—H, are confirmed to be 1, 0.18, and 0.21, respectively, as shown in (b) of FIG. 2.

A more accurate oxidation state can be mathematically calculated using Equation 1:

$$O_x state = \frac{(4 \times (S_{Mn-O-Mn} - S_{Mn-OH})) + (3 \times S_{Mn-OH})}{S_{Mn-O-Mn}} \quad [\text{Equation 1}]$$

According to this equation, the oxidation state of the manganese dioxide deposited on the carbon nanotube yarn is confirmed to be 3.82, which shows good agreement with the Mn peak analysis.

EXPERIMENTAL EXAMPLE 1.3

Structural Investigation

For structural investigation, the CMY was cut using a focused ion beams and its cross section was analyzed.

Figure 3:
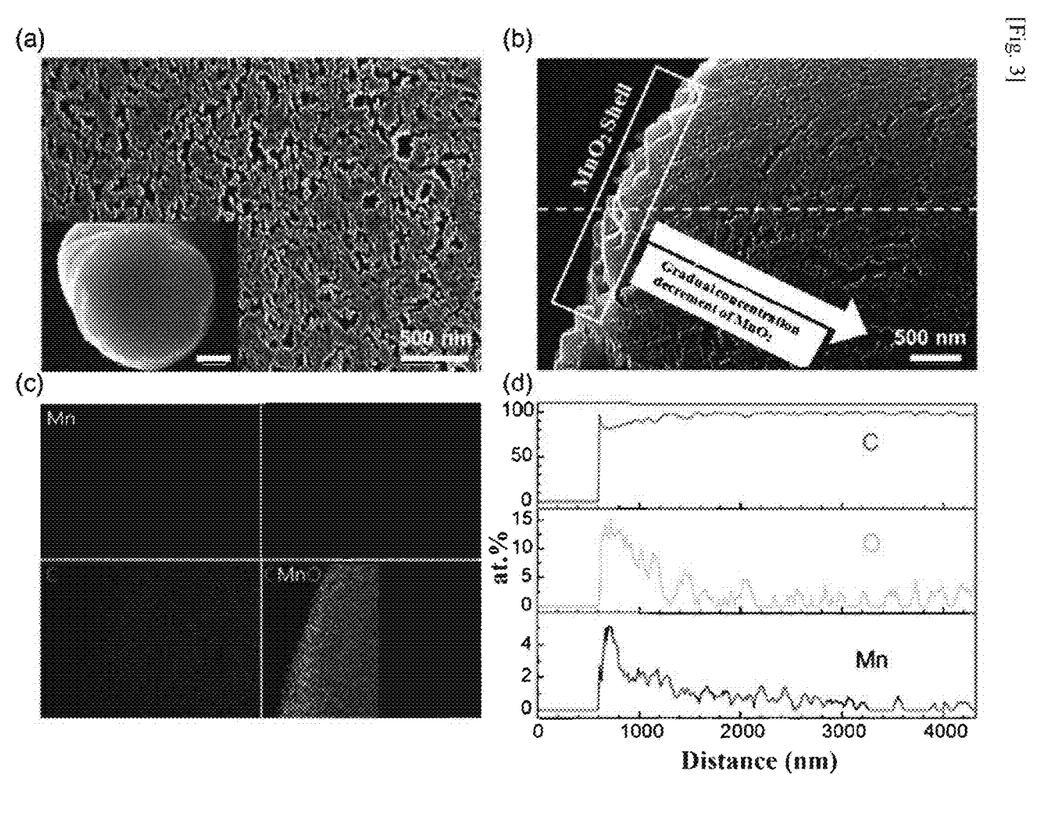

(a) of FIG. 3 is a cross-sectional SEM image of the CMY and shows three-dimensional connection of shaped or unshaped pores. It can be confirmed that mesopores (2-50 nm in diameter) and macropores (larger than 50 nm) are densely formed among the carbon nanotube bundles to form a three-dimensional porous structure with high porosity.

The porosity of the carbon nanotube yarn can be calculated using Equation 2:

$$\Phi = \frac{V_t - V_c}{V_c} \quad [\text{Equation 2}]$$

where $\Phi$ is porosity, $V_t$ is the total volume of the carbon nanotube yarn, and $V_c$ is the volume of the multi-walled carbon nanotubes. The volume of the multi-walled carbon nanotubes can be calculated by dividing the weight of the multi-walled carbon nanotubes by the density of the carbon nanotube bundles (~1.67 g/cm$^3$).

The porosity of the carbon nanotube yarn was calculated to be about 60%. Because the inherently porous multi-walled carbon nanotubes and the aligned carbon nanotube bundles in the carbon nanotube yarn prepared by twisting the carbon nanotubes build up a high-order porous carbon nanotube yarn electrode, high porosity and good electrical conductivity was simultaneously achieved.

In FIG. 3, (b) is a magnified cross-sectional image of an edge part of the CMY electrode and shows the formation of an about 200-300 nm thick shell structure of manganese dioxide (MnO$_2$) deposited on the surface of the carbon nanotube (CNT) yarn. The image reveals that the concentration of manganese dioxide deposited on the carbon nanotube yarn decreases gradually in the direction of the core.

For further investigation, energy dispersive spectroscopy (EDS) and elemental mapping analysis were performed on the cross section of the CMY electrode.

As shown in FIGS. 3c and 3d, the maximum atomic percentage of Mn atoms is at the surface of the CMY and decreases gradually in the direction towards the center of the CMY. The content of carbon is 80 at % at the surface of the CMY and increases gradually to 100 at % as the distance increases in the direction of the core. The Mn and oxygen concentrations decrease gradually to a depth of 2-3 μm below the surface and very small amounts of Mn and oxygen are detected from a depth of ≥4 μm. No Mn peak is found in the core part.

It can be stated, therefore, that the manganese dioxide overlaps with the multi-walled carbon nanotubes, rather than being discretely deposited on the surface of the carbon nanotubes, forming a blended or hybridized CNT/MnO$_2$ (hybridized zone).

In this hybridized zone, the well-developed porous structure of the carbon nanotubes and the self-limited growth of the manganese dioxide not only make ions from the electrolyte easily accessible to the electrochemically active area of the nano-sized manganese dioxide but also contribute to a dramatic shortening in the solid-state ion diffusion length in the metal oxide, achieving high energy storage performance of the CMY electrode.

Moreover, electrons generated according to Equation 3:

$$\text{Mn(III)}_{(x+y)}\text{Mn(IV)}_{1-(x+y)}\text{OOC}_x\text{H}_y \rightarrow \text{Mn(IV)}\text{O}_2 + x\text{C}^+ + y\text{H}^+ + (x+y)e^- \quad [\text{Equation 3}]$$

during the discharging process can be effectively collected in adjacent carbon nanotube bundles, enabling short electron diffusion length and small contact resistance.

Although the volume fraction of manganese dioxide is extremely small compared to the total volume, after the manganese dioxide deposition a cyclic voltammogram (CV) area approximately five times that before the deposition was obtained. This high contribution of manganese dioxide to the energy storage capacity of the inventive supercapacitor is notable compared with other manganese dioxide-based wire-shaped microsupercapacitors (areal capacitance of 3.01 mF/cm$^2$ for the electrode is increased to 3.707 mF/cm$^2$ after manganese dioxide deposition).

The weight of the manganese dioxide deposited on the inventive CMY electrode was measured by electrochemical quartz-crystal microbalance (EQCM).

The mass of the manganese dioxide per area is about 20.4-27.6 μg/cm$^2$, which converts to 4.44-6 wt % of total mass. The relatively small weight percentage of the manganese dioxide loaded on the carbon nanotube yarn can be explained by the morphology characteristic of the electrode that only the surface of the carbon nanotube yarn is utilized as a manganese dioxide loading site and the core of the carbon nanotube yarn acts as an electrical pathway.

EXPERIMENTAL EXAMPLE 1.4

Electrochemical Performances

To confirm the role of the internally trapped manganese dioxide in the CMY electrode, the electrochemical performances of the CMY electrode of Example 1.2 and the control electrode of Comparative Example 1 in which manganese dioxide was deposited onto carbon fiber (MCF), which has no internal porosity, were measured and compared.

Figure 4:
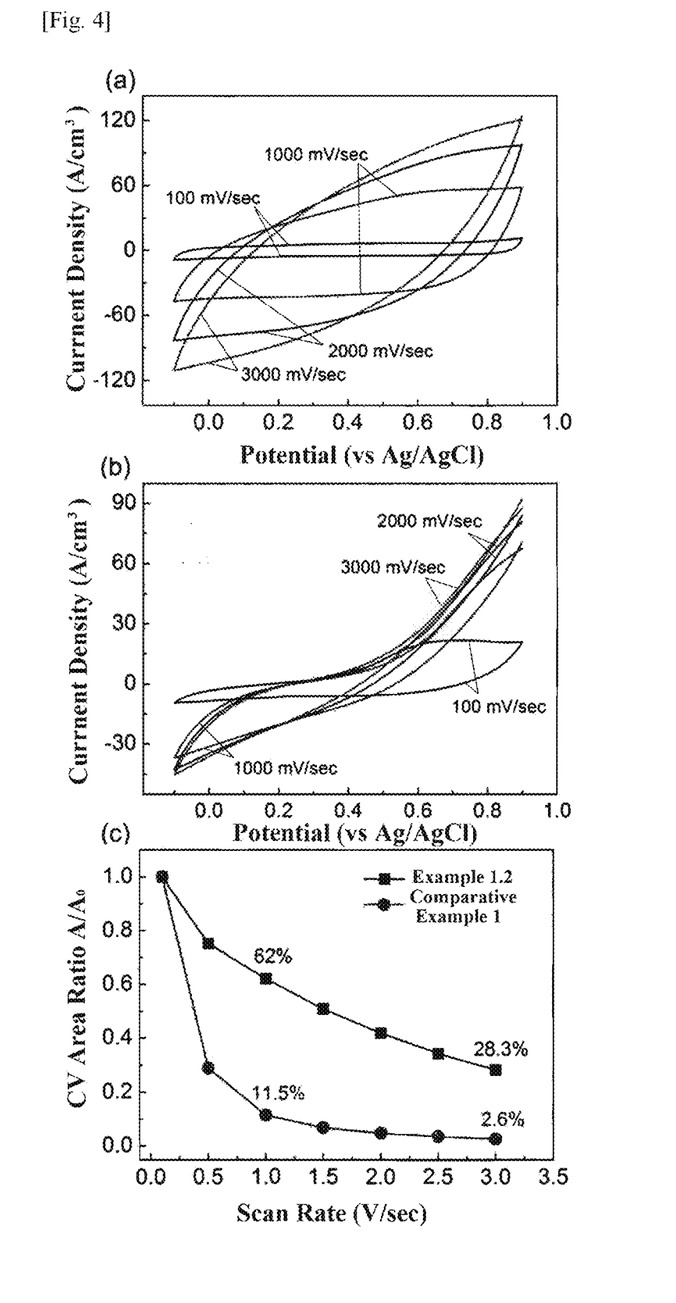
FIG. 4 shows cyclic voltammetry curves of carbon fiber electrodes with various scan rates using a three-electrode system in 0.1 M Na$_2$SO$_4$. (a) of FIG. 4 shows cyclic voltammetry curves of a CMY electrode prepared in Example 1.2. (b) of FIG. 4 shows cyclic voltammetry curves of a control electrode (MCF) prepared by depositing manganese dioxide onto carbon fiber, which has no internal porosity. (c) of FIG. 4 is a plot of cyclic voltammetry area ratios of the CMY and MCF electrodes to compare the retention performance at high scan rates.

In (a) of FIG. 4, cyclic voltammetry (CV) graphs of the CMY electrode at different scan rates are shown. The rectangular CV shape at such a high scan rate of 3000 mV/s represents a very small equivalent series resistance (ESR) of the CMY and fast ion diffusion into the porous structured CMY. On the other hand, CV of the MCF electrode in (b) of FIG. 3 shows significantly dented CVs at high scan rates.

Their rate capability can be calculated by CV area ratio, which is the CV area normalized by initial CV area (at 100 mV/s) and scan rates. The results are shown in (c) of FIG. 4. The CMY retains its CV area up to 62% at 1000 mV/s and 28.3% at 3000 mV/s, while the CV area ratios of the MCF of Comparative Example 1 were calculated to be 11.5% and 2.6% at the same scan rates, respectively.

These capacitance drops at high scan rate can be generally explained by assuming that the ion-accessible area of the metal oxide decreases as the scan rate increases because charge diffusion in manganese dioxide with poor electrical conductivity is interrupted owing to the time constraint for fast charging/discharging. Therefore, this leads to only the outer surface of the manganese dioxide being electrochemically activated, resulting in low performance at high scan rate, as shown in Comparative Example 1.

This kind of problem can be alleviated by incorporating nanostructured manganese dioxide for short ion diffusion length. The nanostructured manganese dioxide is trapped inside the porous yarn to improve the rate capability of the CMY electrode. Therefore, fast charge transfer rate, enlarged electrochemical surface area, and short ion diffusion length are effectively achieved, while electrochemical and structural stabilities of the electrode are well maintained under applied deformation, such as warpage or bending, without significant performance degeneration.

For a real application, the supercapacitor fabricated in Example 1.3 was characterized.

Figure 5:
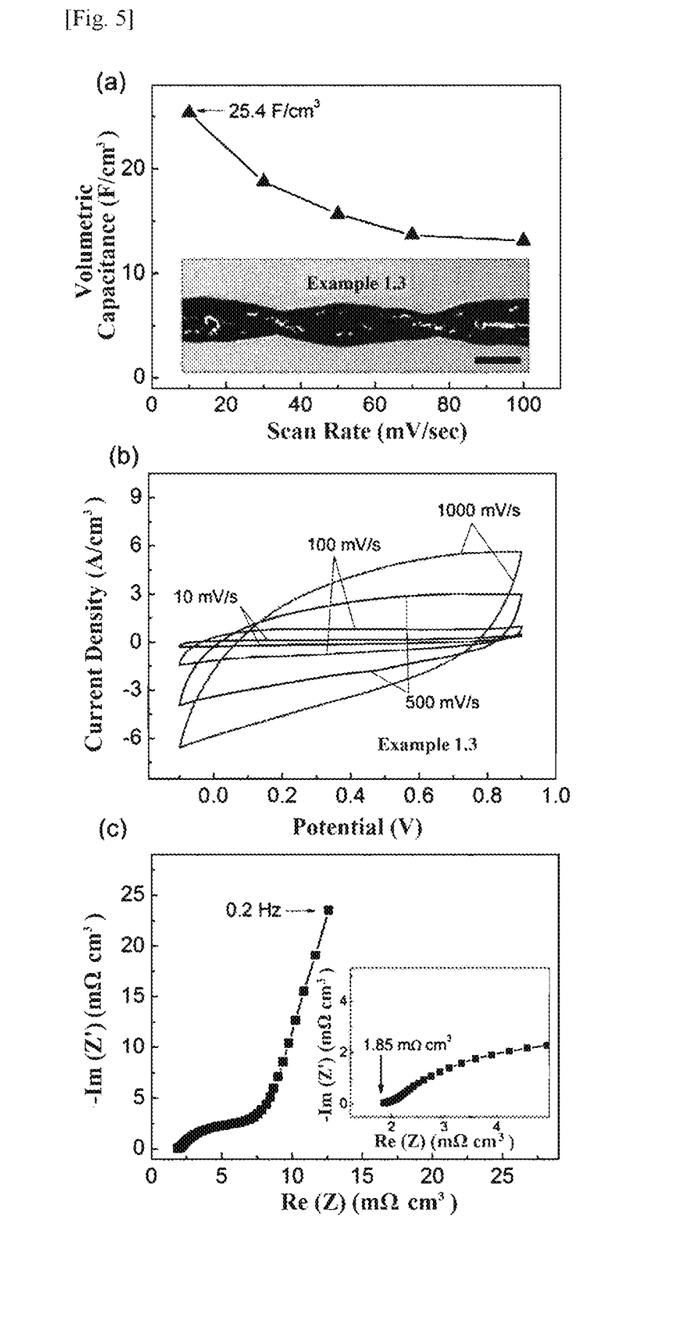
FIG. 5 shows the performance of a solid-state carbon nanotube/manganese dioxide supercapacitor fabricated by coating two strands of CMY electrodes of the same type with an PVA-KOH electrolyte and twisting the coated strands of electrodes in Example 1.3, all performances of the solid-state carbon nanotube/manganese dioxide supercapacitor are normalized by total volume containing the carbon nanotube fiber and manganese dioxide. (a) of FIG. 5 shows a change in volumetric capacitance as a function of scan rate. The inset in (a) is an optical image of the solid-state carbon nanotube/manganese dioxide supercapacitor (scale bar represents 30 μm). (b) of FIG. 5 shows cyclic voltammetry curves of the solid-state carbon nanotube/manganese dioxide supercapacitor with various scan rates. (c) of FIG. 5 is a Nyquist curve of the solid-state carbon nanotube/manganese dioxide supercapacitor (scale bar represents 30 μm). The inset in (c) shows a high frequency region (100 kHz~) of the Nyquist curve).

In FIG. 5, (a) shows a change in the volumetric capacitance of the supercapacitor fabricated in Example 1.3 as a function of scan rate. The inset is an image of the solid-state carbon nanotube/manganese dioxide composite yarn supercapacitor. The highest volumetric capacitance was 25.4 F/cm$^3$, which is about 10 times the maximum volumetric capacitance (2.5 F/cm$^3$) of the manganese dioxide/carbon fiber prepared in Comparative Example 1.

The volumetric capacitance can be calculated using Equation 4:

$$C_{volumetric} = \frac{Q(CNT/MnO_2 yarn)}{\Delta V \times \text{volume}(CNT/MnO_2 yarn)} \quad [\text{Equation 4}]$$

where Q is the charge and $\Delta V$ is the width of the voltage window.

CV curves of the solid-state CMY supercapacitor fabricated in Example 1.3 were measured at various scan rates and are presented in (b) of FIG. 5. A pseudo-capacitive rectangular CV shape is observed at a scan rate of 100 mV/s. In electrochemical impedance spectroscopy (EIS) measurement, normalized ESR measured at 1 kHz for the CMY supercapacitor is as small as 2.12 mΩ·cm$^3$. In addition, the high slope of the Nyquist curve in the high frequency region also implies a good capacitive characteristic for the CMY supercapacitor.

EXPERIMENTAL EXAMPLE 1.5

Flexibility Measurement

For further investigation of flexibility, the CMY electrode prepared in Example 1.1 was used without deformation ("not deformed CMY electrode"), wound around a glass tube ("wound CMY electrode"), and knotted ("knotted CMY electrode"), and their CV curves were measured at a scan rate of 100 mV/s.

Figure 7:
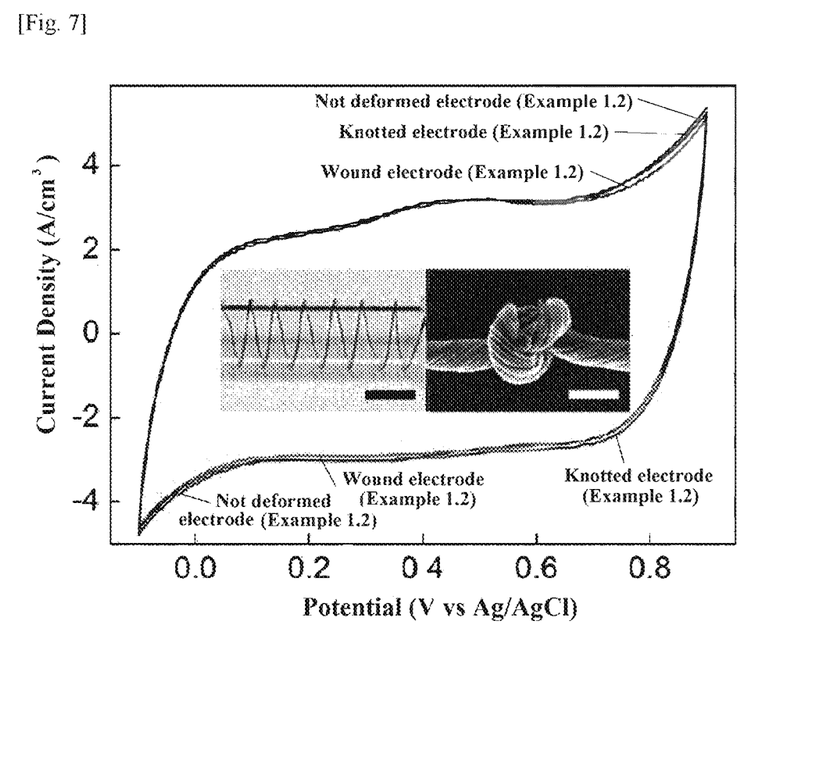
FIG. 7 shows cyclic voltammetry graphs of a CMY electrode prepared in Example 1.2 at a scan rate of 100 mV/s before deformation ("not deformed electrode"), after winding around a glass tube ("wound electrode"), and after knotting ("knotted electrode"). The insets show images of the wound (scale bar=1 mm) and knotted CMY electrodes (scale bar=25 μm).

As shown in FIG. 7, the areas of CV plots from the bent and knotted CMY electrodes were identical to that of the non-deformed one.

EXPERIMENTAL EXAMPLE 1.6

Bending Test

Figure 8:
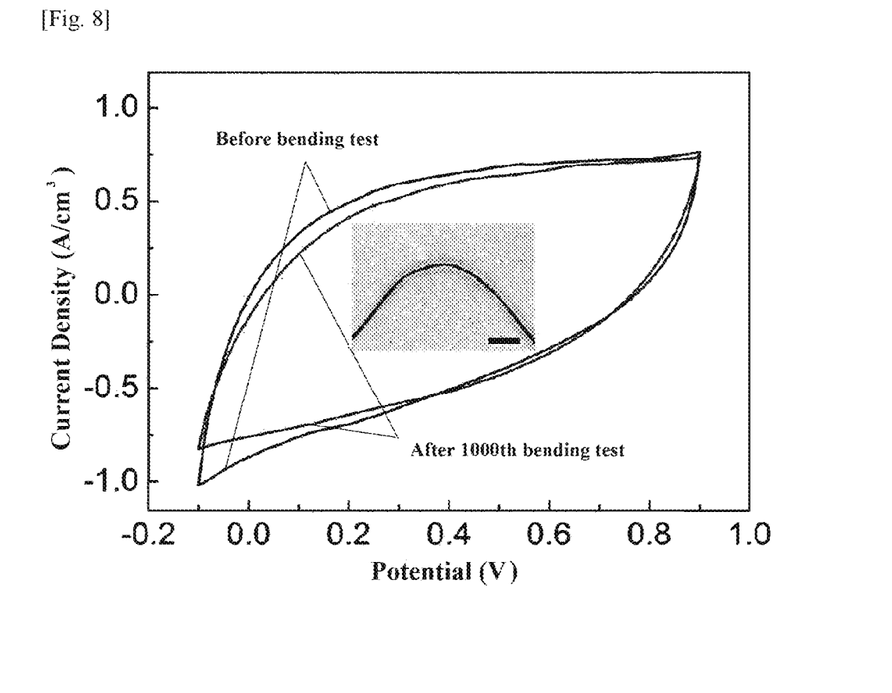
FIG. 8 shows the results of bending test on a solid-state carbon nanotube/manganese dioxide composite yarn supercapacitor fabricated in Example 1.3 and compares cyclic voltammetry plots of the solid-state carbon nanotube/manganese dioxide composite yarn supercapacitor before and after 1000th bending test. The inset shows an image of the bent solid-state carbon nanotube/manganese dioxide composite yarn supercapacitor with ≥90° bending angle (Scale bar=1 mm).

A bending cycling test with the supercapacitor of Example 1.3 was performed to figure out the effect of stress on it and the results are shown in FIG. 8. No significant capacitance drop was observed in the CV curves after the 1000$^{th}$ bending with 90° bending angle compared to before bending. These results imply that the performances of the inventive CMY electrode and the inventive supercapacitor could be quite well maintained under mechanically harsh conditions.

Such characteristics can be explained by the unique mechanical properties of the carbon nanotube yarn and good deposition of manganese dioxide with a concentration gradient on the carbon nanotube bundles.

Figure 9:
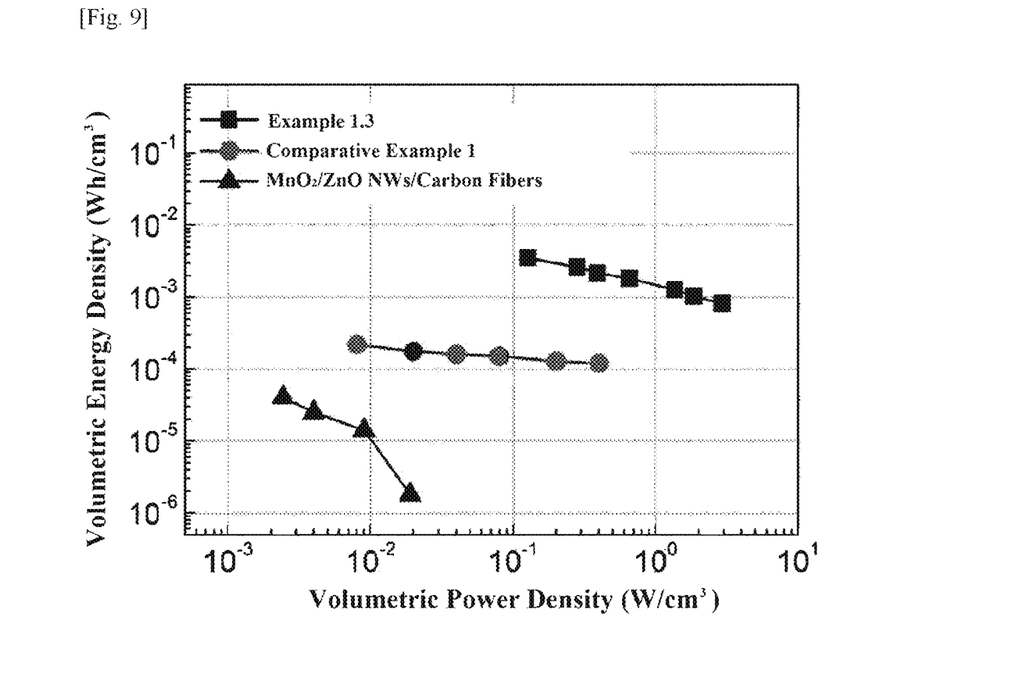
FIG. 9 shows energy and power densities for a solid-state carbon nanotube/manganese dioxide composite yarn supercapacitor fabricated in Example 1.3 and a manganese dioxide/carbon fiber (known in ACS Nano 2012, 6, 9200) and a manganese dioxide/zinc oxide nanowires (NWs)/carbon fiber (known in ACS Nano 2013, 7, 2617) as controls. The highest values of energy and average power densities were measured to be 3.52 mWh/cm$^3$ and 127 mWh/cm$^3$, respectively.

FIG. 9 shows energy and power densities for the solid-state CNY supercapacitor of Example 1.3, the MnO$_2$/carbon fiber of Comparative Example 1, and a MnO$_2$/ZnO nanowires (NWs)/carbon fiber (known in ACS Nano 2013, 7, 2617).

The energy and power densities can be calculated by Equations 5 and 6, respectively.

With the EQCM measurement, oscillation frequency differences between the working and reference crystals were transformed into deposited MnO$_2$ mass using the Sauerbrey equation:

$$\Delta f = \frac{-2 f_0^2 \Delta M}{A(\mu \rho)^{0.5}} \quad [\text{Equation 5}]$$

where $f_0$ is the resonant frequency of the reference crystal, and $\mu$ and $\rho$ are the sheer parameter and density of crystal, respectively. With the known electrode area (A), the mass change ($\Delta M$) of deposited manganese dioxide can be calculated by recording the frequency change ($\Delta f$) between the working crystal and the reference one.

Figure 10:
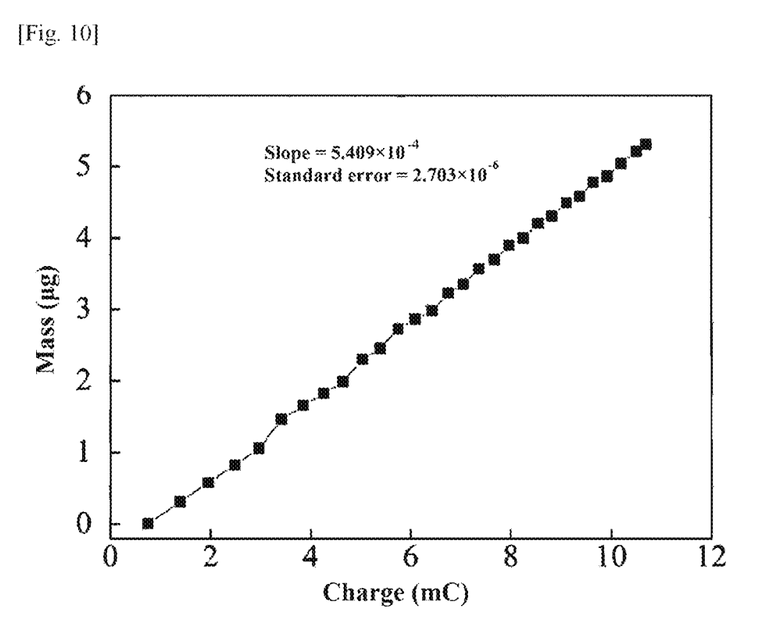
FIG. 10 shows the mass of as-deposited manganese dioxide per unit charge. The mass was determined to be approximately 5.41×10$^{-4}$ g/C.

From the slope of the curve shown in FIG. 10, the mass of as-deposited manganese dioxide per unit charge transferred was determined to be approximately 5.41×10$^{-4}$ g/C. For a given constant scan rate v (Vs$^{-1}$), the average power during charge ($P_{av}$ [W]) can be calculated by integrating the current density (I) versus voltage (V) curve:

$$P_{av} = \frac{1}{2} \int I dV \quad [\text{Equation 6}]$$

Integration to obtain the average power during charge and discharge provided nearly identical results.

The discharged energy (E [Wh]) can be calculated using Equation 7:

$$E = \frac{V_i}{\upsilon \times 3600} \times P_{av}$$ [Equation 7]

As can be seen from FIG. 8, the energy and average power densities of the supercapacitor of Example 1.3 are 3.52 mWh/cm³ and 127 mWh/cm³, respectively. In contrast, the energy and average power densities of the supercapacitor of Comparative Example 1 are 0.22 mWh/cm³ and 8 mWh/cm³, respectively, and those of the MnO$_2$/ZnO nanowires (NWs)/carbon fiber are 0.04 mWh/cm³ and 2.44 mWh/cm³, respectively. These results demonstrate high performance of the inventive supercapacitor.

INDUSTRIAL APPLICABILITY

The yarn supercapacitor of the present invention has very high performance and can maintain its high electrochemical performance under applied deformation, for example, bending, twisting or weaving, because of its highly internally porous structure, extraordinary mechanical properties and good electrical conductivity. Based on these characteristics, the yarn supercapacitor of the present invention is easily applicable to flexible devices, even wearable devices, and microelectromechanical systems where high flexibility is greatly necessary.

The invention claimed is:

1. A carbon nanotube/manganese dioxide yarn electrode comprising:
    a carbon nanotube yarn having a twisted layer-by-layer structure of at least one carbon nanotube sheet; and
    manganese dioxide deposited on a surface and in internal pores of the carbon nanotube yarn;
    wherein the manganese dioxide is deposited to a depth below the surface of the carbon nanotube yarn, and
    wherein a thickness of the the manganese dioxide deposited on the surface of the carbon nanotube yarn is from 100 nm to 500 nm and a depth of the manganese dioxide deposit is from 1 μm to 5 μm below the surface of the carbon nanotube yarn.

2. The carbon nanotube manganese dioxide yarn electrode according to claim 1, wherein the carbon nanotube yarn comprises one to five carbon nanotube sheets in the twisted layer-by-layer structure.

3. The carbon nanotube/manganese dioxide yarn electrode according to claim 1, wherein the carbon nanotube sheets of the carbon nanotube yarn comprise from 7,000 to 12,000 twists per meter.

4. The carbon nanotube /manganese dioxide yarn electrode according to claim 1, wherein the carbon nanotube yarn has a diameter of 15 μm to 30 μm.

5. The carbon nanotube/manganese dioxide yarn electrode according to claim 1, wherein an amount of the manganese dioxide is is from 4.0 to 6.0% by weight, based on the total weight of the carbon nanotube/manganese dioxide yarn electrode.

6. The carbon nanotube/manganese dioxide yarn electrode according to claim 1, wherein the internal pores comprise mesopores with a diameter of 2 nm to 50 nm and macropores with a diameter of 50 nm to 1000 nm.

7. The carbon nanotube/manganese dioxide yarn electrode according to claim 1, wherein the carbon nanotube yarn has a porosity of 40 to 80%.

8. The carbon nanotube/manganese dioxide yarn electrode according to claim 1, wherein the carbon nanotube yarn has a bias angle of 20° to 40°.

9. The carbon nanotube/manganese dioxide yarn electrode according to claim 1, wherein the twist of the carbon nanotube yarn is to the right (Z-lay) or left (S-lay).

10. An electrode textile comprising the carbon nanotube/manganese dioxide yarn electrode according to claim 1.

11. A yarn supercapacitor comprising the carbon nanotube/manganese dioxide yarn electrode according to claim 1.

12. The yarn supercapacitor according to claim 11, wherein the yarn supercapacitor is bendable, knottable, and weavable.

13. A solid-state composite yarn supercapacitor comprising the carbon nanotube/manganese dioxide yarn electrode according to claim 1 as a first electrode, a second electrode of the same type as the first electrode, and a polyvinyl alcohol-potassium hydroxide solid electrolyte coated on the two electrodes.

14. The solid-state composite yarn supercapacitor according to claim 13, wherein the two carbon nanotube/manganese dioxide yarn electrodes are twisted into a single thread or are arranged parallel to each other at an interval of 1 to 10 nm.

15. The solid-state composite yarn supercapacitor according to claim 13, wherein the solid-state composite yarn supercapacitor is bendable, knottable, and weavable.

* * * * *